United States Patent [19]

Shaw

[11] 4,249,563
[45] Feb. 10, 1981

[54] MANIFOLD FOR REPLACING RELIEF VALVES

[75] Inventor: Harry N. Shaw, Hendersonville, N.C.

[73] Assignee: The Protectoseal Company, Bensonville, Ill.

[21] Appl. No.: 85,503

[22] Filed: Oct. 17, 1979

[51] Int. Cl.³ .................. F16K 43/00; F16K 35/14
[52] U.S. Cl. ................................ 137/315; 137/636;
 137/637.1; 251/88; 251/113; 251/228; 251/298
[58] Field of Search ........... 137/315, 636, 637, 637.1;
 251/86, 87, 88, 228, 298, 95, 111, 113

[56] References Cited

U.S. PATENT DOCUMENTS

| 1,001,624 | 8/1911 | Curtin | 251/86 |
| 1,284,063 | 11/1918 | Davis, Jr. et al. | 251/86 |
| 1,379,025 | 5/1921 | Jones et al. | 137/637 |
| 2,165,640 | 7/1939 | Marx | 251/86 |
| 2,647,536 | 8/1953 | Lunde | 137/636 |
| 2,720,214 | 10/1955 | Rupp et al. | 137/315 |
| 2,980,140 | 4/1961 | McMillan | 137/637 |

FOREIGN PATENT DOCUMENTS 9707 of 1911 United Kingdom ............. 251/228

Primary Examiner—Martin P. Schwadron
Assistant Examiner—G. L. Walton
Attorney, Agent, or Firm—Rummler & Snow

[57] ABSTRACT

A manifold mounting pairs of relief valves in side-by-side clusters having a slide-rod interlock cooperating with swing-mounted clapper discs and operationally engaging handles connected thereto for selectively isolating one valve at a time from pressure in the manifold in preparation for its removal and replacement under pressure therefrom.

11 Claims, 6 Drawing Figures

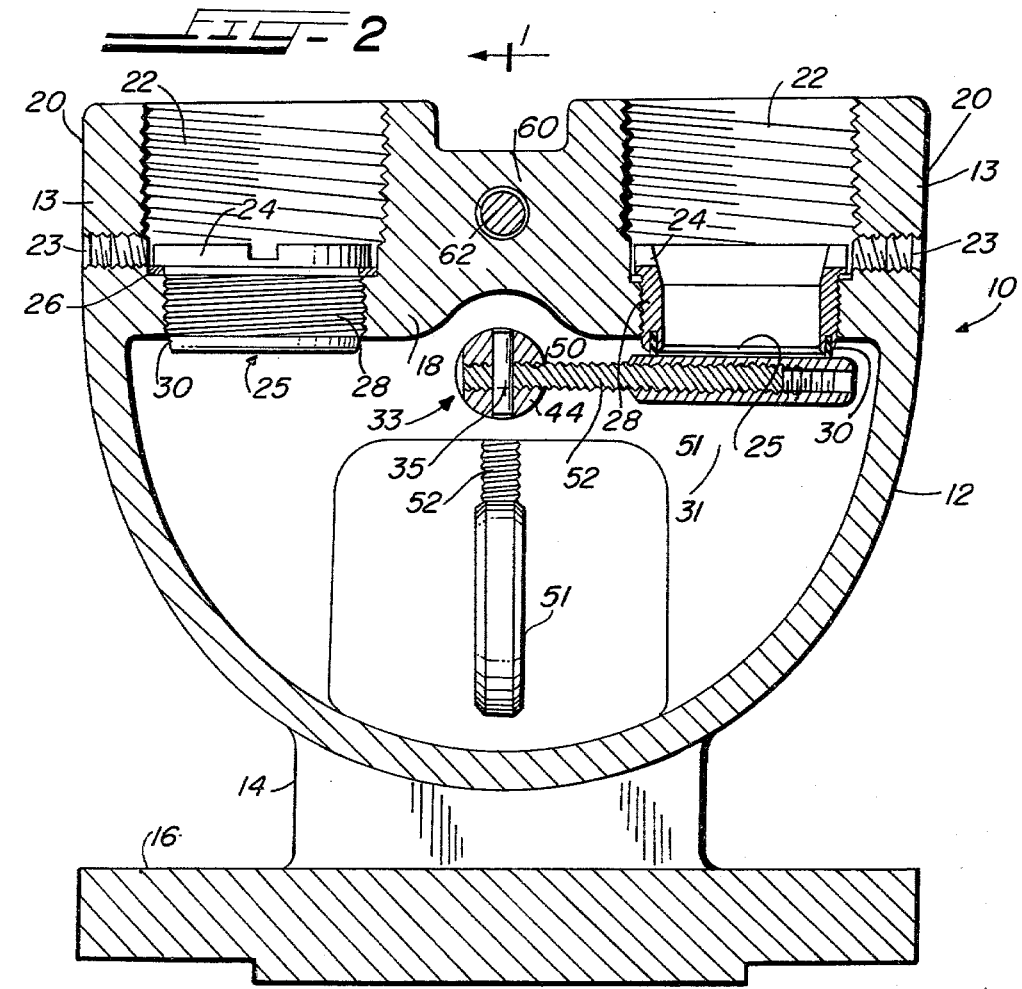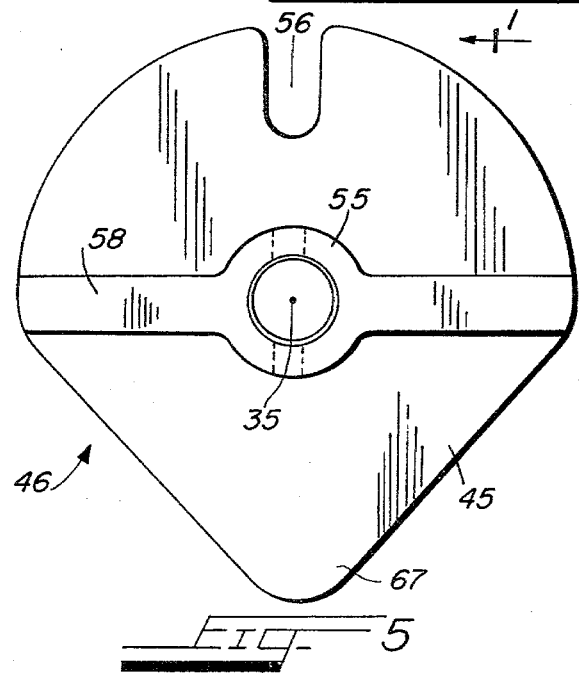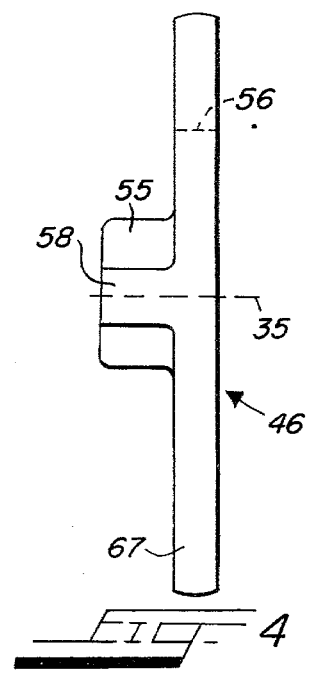

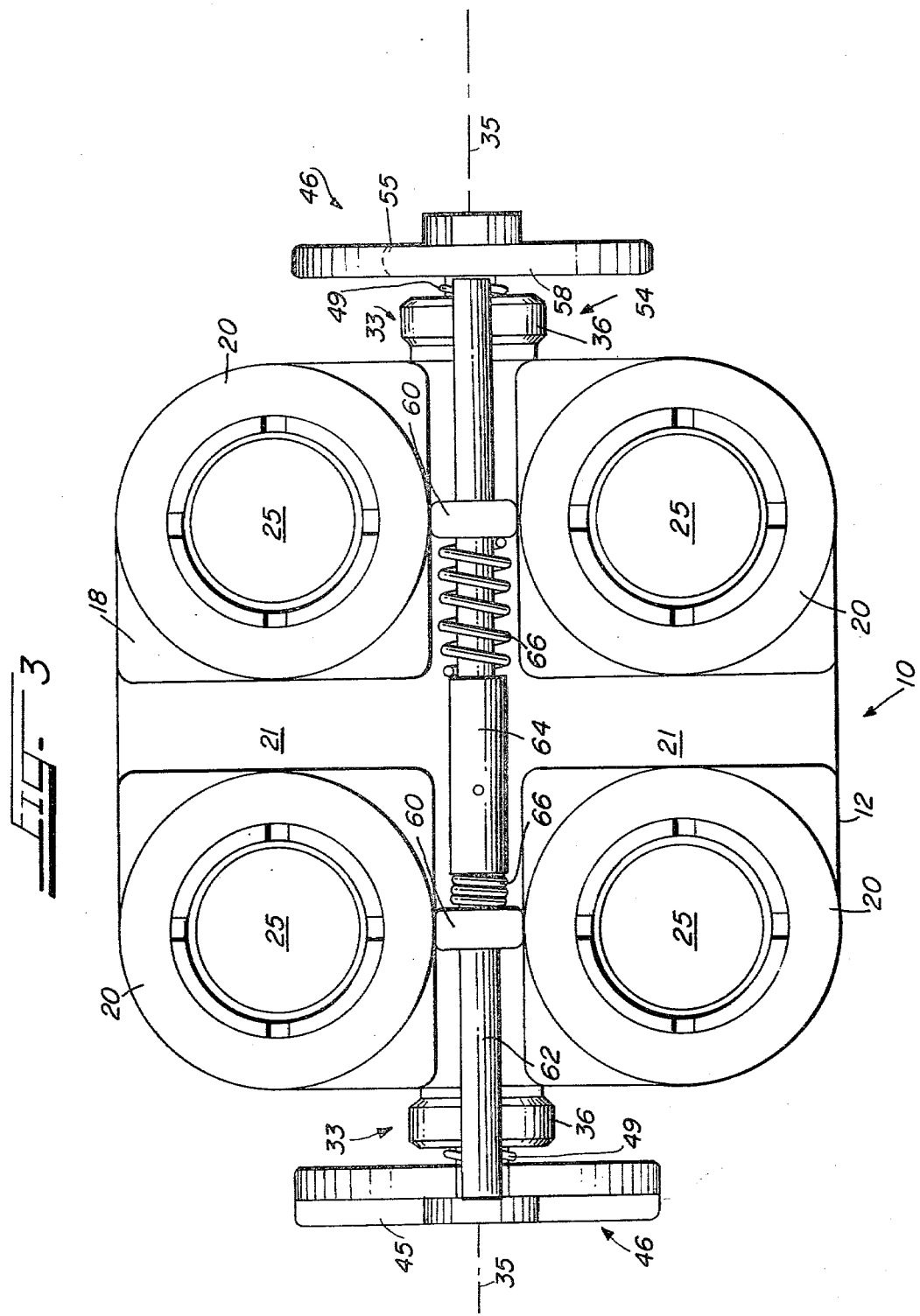

MANIFOLD FOR REPLACING RELIEF VALVES

BACKGROUND OF THE INVENTION

The prior art in manifolds for replacing relief valves in LPG storage applications characteristically has valve clusters mounted in one body whereby valves connect to a number of ports in the body which are circularly arranged and equally spaced about a common center. Each port is selectively closed one at a time by a single lever-mounted clapper disc which is indexed to rotate about said center and register with successive ports for said valves in said cluster. A cam mechanism operates the lever to clap the disc on each port connecting to a valve to be replaced as it is rotated by a miter gearset centrally mounted in the body of the manifold with a handwheel which is operationally connected thereto. See U.S. Pat. No. 2,720,214.

There is an established need for a manifold having two basic objectives: (1) to replace a plurality of relief valves individually mounted on tanks which cannot be removed for reasons of malfunction, periodic bench inspection, etc., without bleeding down the tank pressure and contents; and (2) as related to the background above.

SUMMARY OF THE INVENTION

The gist of this invention lies in a manifold which mounts a cluster of four relief valves in pairs astraddle a common vertical plane in side-by-side relation one to the other. Ports for selectively isolating one valve of each pair of valves from pressure within the manifold lie in a horizontal plane within the manifold in fluid communication with each of said valves. Clapper discs swing-mount on an axis within the manifold which is perpendicular to a plane containing a port axis in an eccentric relation thereto for closing selected ports and isolating respective valves connected thereto from pressure in the manifold. Stems support the clapper discs on arms which pivotally mount on the swing axis of the manifold below the horizontal plane of the ports in said vertical plane. Said stems sealingly extend through bosses in the wall of the manifold to the outside thereof. Handles having slots and points in the rim at 180° relationship one to the other mount on the outside extended ends of each of the stems therefrom. A slide-rod slidingly mounts on the top of the manifold to cooperatively interlock with the slot in and fix the angular location of one of said handles such that the clapper disc which operationally connects to said handle is held in the open-port position, while the other handle is free to rotate 90° about its slot in either direction and selectively close with its clapper disc but one port and isolate but one valve at a time in the manifold in preparation for the removal and replacement of the same. The points of the handles accurately indicate the angular locations of the clapper discs. Lugs on the handles facilitate turning by hand.

DESCRIPTION OF THE DRAWINGS

FIG. 2 shows a cross-section end view of the manifold taken along line 2—2 of FIG. 1;

FIG. 3 shows a top view of FIG. 1;

FIG. 4 shows a side view of the handle for operating the slide-bar interlock between clapper discs;

FIG. 5 shows an end view of the handle of FIG. 4; and

DESCRIPTION OF THE PREFERRED EMBODIMENT

Figure 1:
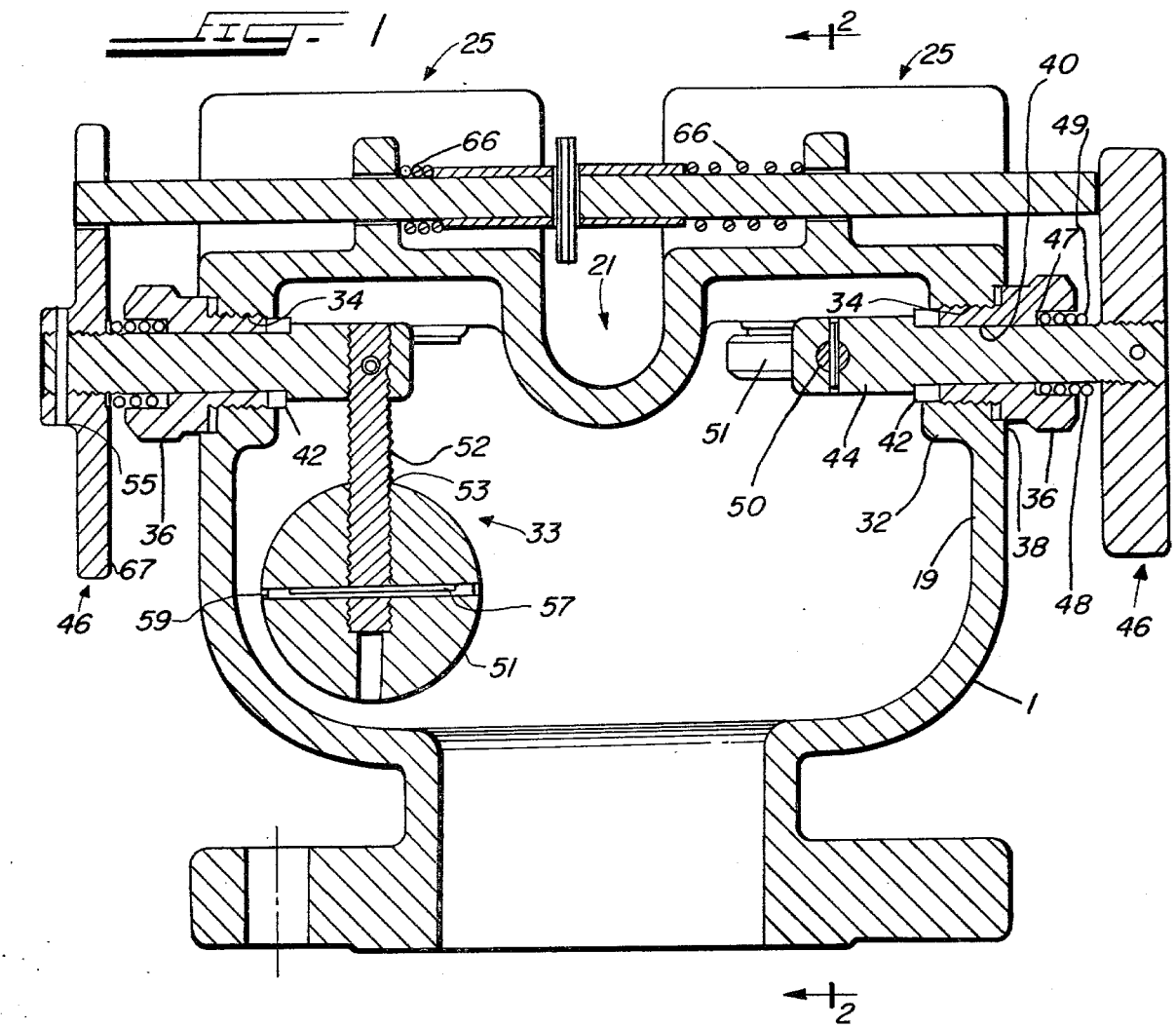
FIG. 1 shows a cross-section side view of a manifold of this invention taken along line 1—1 of FIG. 2 mounting a four-ported cluster of relief valves.

Reference to FIGS. 1 and 2, a four-port relief valve manifold 10 has an enlarged body portion 12 with sidewalls 13 having a pipe section 14 depending therefrom and a flange 16 integrally formed at the bottom thereof. The flange 16 mates with a similar flange on the tank (not shown), the two flanges being secured together by throughbolts (not shown) with a suitable sealing means (not shown) therebetween.

Figure 6:
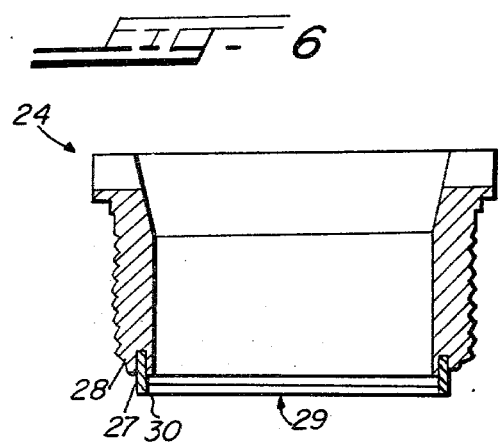
FIG. 6 shows a fragmentary cross-section view of the seat ring for clapper disc ports.

An integral horizontal wall 18 tops the enlarged body portion 12 and incorporates a "U" section 21 for directing flow to the valve ports 25 to minimize turbulence and increase flow efficiency. Two pairs of bosses 20 mount on wall 18 in side-by-side relation and extend upwardly therefrom for mounting relief valves (not shown), each pair of which lies astraddle a plane containing the cross-section taken along line 1—1. Seated and threaded counterbores 22 extend downwardly into each boss 20, as shown in FIG. 2. A threaded bore 23 in sidewalls 13 intercepts the bottom of counterbore 22 for containing a bleeder valve (not shown). A threaded seat ring 24 engages the lower threaded portion of each of the seated counterbores 22, as sealed therein by a seated teflon gasket 26. A valve port means 25 lies in a horizontal plane at the bottom of seat ring 24, as shown in FIG. 6, having a rectangular face groove 27 in the bottom of rim 28 that depends therefrom. A resilient teflon ring 30 of thin rectangular cross-section inserts in the face groove 27 in rim 28. A sealing lip 29 is formed by the lower extension of the thin edge of teflon ring 30 from the groove 27 in rim 28.

Conventional threaded safety relief valves (not shown) engage the upper threaded portion of the counterbore 22.

Referring to FIGS. 1 and 2, a port closing means 31 operationally mounts in sidewall 19 of body portion 12. Clapper disc operating assemblies 33 pivotally mount in sidewall 19 on a horizontal swing axis 35 in bosses 32 adjacent to the underside of top wall 18 at the opposed ends of the cross-section of the manifold 10. Threaded seated bores 34 extend through each boss 32, as shown in FIG. 1. A threaded hexhead seat insert 36 engages the thread of each seated threaded bore 34, as sealed therein by a seated teflon gasket 38, having a bore 40 countersunk at both ends thereof. A teflon seal ring 42 mounts in the countersunk bore 40 at the inner end of the bushing 36. A step-shouldered stem 44 pivotally engages its head end against the teflon seal ring 42 of the bore 40 of the seat insert 36 on the inside of body 12 of manifold 10 and extends its shank and threaded end through bore 40 therein outside of the body 12 therefrom. A handle means 46 threadedly engages and is suitably pinned to the threaded end of the stem 44 and for operating each clapper disc assembly 33.

A teflon washer 47 mounts in the countersunk bore 40 at the outer end of the bushing 36 around the shank of the stem 44. A teflon washer 48 mounts around the shank of the stem 44 against the side of the handle 46. A compression spring 49 mounts around the shank of the stem 44 between the teflon washers 47 and 48. A threaded bore 50 traverses the head end of the stem 44 at right angles to the axis thereof. A threaded arm 52 threadedly engages the threaded bore 50 and is suitably pinned to the head end of the stem 44.

A clapper disc 51, having a threaded bore 53 traversing its diameter from edge-to-edge thereof between the sides of the same, threadedly engages the threaded arm 52 and is suitably pinned to the end of the same for selective registration with the seal ring 30 of each of the ports 25 of the manifold 10. The threaded bore 53 of clapper disc 51 and the threaded arm 52 are of a class 1 loose fit, and a right angled traverse line bore 57 of clapper disc 51 containing pin 59 is of somewhat different diameter to provide a limited free movement of clapper disc 51 relative to arm 52 for a full face contact with sealing lip 29.

A means for interlocking port closing 54 operationally mounts on the top wall 18 of body portion 12 and engages handles 46 for each of the clapper disc operation assemblies 33. Handle means 46 comprises a stop or segment of a disc-like member 45 having mounted on its outer face a hub 55 including a slot 56 and a pointer 67 radially disposed at 180° to one another in the rim of the same, as shown in FIGS. 4 and 5. Handles 46 mount at right angles on their respective stems 44 in right-angle relationship with respect to the angular position of the clapper disc 50 on the port closing means 31. Line-bored lugs 60 mount on the top wall 18 of body portion 12 between opposed pairs of ports 20 in the manifold 10, as shown in FIG. 3. A slide-rod 62 slidingly inserts in the bores of lugs 60 having a stop sleeve 64 therearound which is suitably pinned to said rod 62 between said lugs 60. Compression springs 66 mount between each lug 60 and the corresponding end of stop sleeve 64 for urging the rod 62 to center between lugs 60. Each end of rod 62 operationally engages slots 56 and abuts the inner face of either side thereof on each of the handles 46 on opposed ends of the clapper disc operating assemblies 33 of manifold 10, as shown in FIG. 1.

In the operation of the four-port relief valve manifold 10 to close the valve port 25 to the rear on the right hand side, as shown in FIG. 1, the slot 56 of handle 46 on the left hand side is indexed to register with the slide-rod 62. The rod 62 is then slid to the left disengaging from slot 56 in the right hand handle 46 and engaging slot 56 in the left hand handle 46. Clapper disc operating assembly 33 on the right hand side of FIG. 1 is then rotated 90° until clapper disc 51 on the right sealingly cooperates with resilient sealing lip 29 on teflon ring 30 to close off valve port 25 to the rear on the right hand side, as shown in FIG. 1. The pointer 67 on handle 46 indicates the position of clapper disc 51. Lugs 58 on the handle 46 facilitate hand operation of the clapper disc assembly 33. Bleeder valve 23 is opened to bleed off pressure between the relief valve (not shown) installed in threaded counterbore 22 in each boss 20 and the clapper disc 51 prior to removal of the relief valve.

Although but one specific embodiment of this invention is herein shown and described, it will be understood that details of the construction shown may be altered or omitted without departing from the spirit of the invention as defined by the following claims.

I claim:

1. In a relief valve manifold having a piped flange for a base, a contiguous, enlarged and elongated sidewall mounted thereon for a body and a pressure-tight, horizontal wall sealed thereon for a top, the improvement comprising:

(a) a plurality of port means lying in a horizontal plane and depending in side-by-side relation from the top wall of the body within the enlarged portion of the same, having a bleeder valve means communicating with the outside thereof mounted in the sidewall of the same, said port means being mounted to straddle a vertical plane containing a horizontal swing-axis running therethrough adjacent to and below the plane of the port means within said body and a plurality of valve means for closing said port means;

(b) a port-closing means operationally-mounted through the sidewalls of said body on said swing-axis;

(c) at least one handle means having an aperture therethrough offset from and extending in the direction of the swing axis and an inner side face perpendicular thereto operationally-connected to the port-closing means outside of and on the swing-axis of the manifold for actuating each valve means for closing each port; and (d) interlocking means mounted on the top wall of the body outside of said manifold operationally-engaging the aperture in one of said handle means and abutting the inner side face of the other handle means for selectively permitting the closing of one of said port means one port at a time while positively maintaining the remaining ports open for servicing the valve means in the closed port means.

2. In a relief valve manifold, as set forth in claim 1, wherein the port means comprises:

(a) a rim having a bottom face depending therefrom; and (b) a resilient sealing means mounted on the bottom face of said rim.

3. In a relief valve manifold, as set forth in claim 2, wherein the resilient sealing means comprises:

(a) a circumferential groove in the bottom face of said rim; and (b) a lip means of elastomeric material inserted into said groove in said rim and depending from the bottom face thereof.

4. In a relief valve manifold, as set forth in claim 3, wherein the lip means comprises a thin teflon ring.

5. In a relief valve manifold, as set forth in claim 1, wherein the port closing means comprises:

(a) bosses in the wall of said body having counterbored bores extending from outside of the body therethrough on the swing-axis of the manifold;

(b) counterbored seat inserts sealingly engaging each of the bores in said bosses from the outside thereof in concentric relation therewith;

(c) a shouldered cylindrical stem pivotally mounting in and sealingly engaging said bores in each of said seat inserts extending outside of the body of the manifold from within the same;

(d) an arm having one end engaging and fixed to the inner end of the stem within said body and extending at right angles therefrom with relation to the swing-axis thereof;

(e) a clapper disc engaged with and mounted on the other end of said arm having the plane of its disc in the plane formed by the swing-axis and the axis of the arm; and (f) a limited free-movement means installed between the clapper disc and the other end of said arm mounting said disc for providing full face sealing contact with said port means.

6. In a relief valve manifold, as set forth in claim 5, wherein all engagements between said bosses and seat inserts, said arm and stem and said clapper disc and arm are threaded.

7. In a relief valve manifold, as set forth in claim 5, wherein the limited free-movement means comprises:
   (a) a loose fit between the bore in said clapper disc and the arm;
   (b) a traverse bore thereto; and
   (c) a pin of loose fit therein.

8. In a relief valve manifold, as set forth in claim 1, wherein the handle means comprises:
   (a) a stop member having a rim in concentric relation with the swing-axis of the manifold fixedly mounted on and radially extending from the outside extension of said port closing means and a radially-extending slot therein; and
   (b) a pointer means mounted on said stop member extending across the inner face of the axial stop member at 180° angle to said slot.

9. In a relief valve manifold, as set forth in claim 8, wherein the interlocking means comprises:
   (a) lugs mounted on top of the body line-bored along a horizontal axis in the plane of the swing-axis, above the top of the same; and
   (b) a slide-rod means slidingly inserted in the bores of said lugs, the ends of which rod selectively engage the slot in the rim of one of said stop members and free the other, said stop members thereof each having their rim slots configured at right angles relative one to the other about the swing-axis of the manifold so that when one clapper disc and its respective port closing means is fixed in the vertical plane relative to two side-by-side ports, the other clapper disc is free to selectively close one of the other ports of the pair of valves.

10. In a relief valve manifold, as set forth in claim 9, wherein the slide-rod means comprises:
    (a) a rod;
    (b) a shoulder sleeve axially fixed on said rod between said lugs; and
    (c) compression springs concentrically mounted on said rod between each of said lugs and each end of said shoulder sleeve.

11. In an apparatus for isolating one valve at a time from pressure in a manifold which is in fluid communication with a source of pressure, wherein said manifold mounts two pairs of valves in four ports in side-by-side relation to straddle a common vertical plane and fluid communicates with the inlets to said valves and said source of pressure through said ports in a common horizontal plane within said manifold, the improvement comprising two clapper members each swing-mounted within the manifold on an axis which extends in a plane parallel to the plane of the ports, said axis displaced from the horizontal plane of the ports in a direction toward the source of pressure, and directed in perpendicular relation to planes containing the axes of opposed pairs of said ports and in eccentric relation thereto, a pair of handles having radial slots therethrough offset from and extending in the direction of the swing mounted axis and an inner face perpendicular thereto operationally connected to each clapper member on said swing-axis outside of said manifold, a compression spring centered rod slidingly mounted on a horizontal axis in said common vertical plane above the horizontal plane containing said ports and arranged for engaging one of the slots of said handles at one end thereof and abutting the inner side face of the other handle at its other end so that one port of the four ports in the manifold closes at any one time for servicing the valve in that port.

* * * * *